Figure 1:
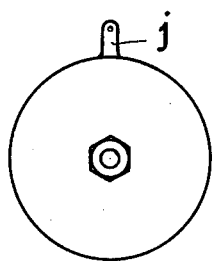

Oct. 14, 1930.  E. PRESSER  1,778,645

ELECTRICAL ALTERNATING CURRENT RECTIFIER

Filed Feb. 11, 1929

E. Presser
INVENTOR

By: Marks & Clerk
ATTYS.

Patented Oct. 14, 1930

1,778,645

UNITED STATES PATENT OFFICE

ERNST PRESSER, OF NUREMBERG, GERMANY, ASSIGNOR TO SÜDDEUTSCHE TELEFON-APPARATE, KABEL- UND DRAHTWERKE AKTIENGESELLSCHAFT, OF NUREMBERG, GERMANY

ELECTRICAL ALTERNATING-CURRENT RECTIFIER

Application filed February 11, 1929, Serial No. 339,256, and in Germany December 6, 1927.

The present application relates to electric alternating current rectifiers and is a continuation in part of application Serial No. 327,-739, filed December 21, 1928.

It is known that selenium, selenium compounds, metal oxides, metal sulphides and other substances can be used for rectification purposes. For rectification purposes such substance is placed between two electrodes which may, for instance, be made of metal. The electrodes are generally in the form of plates and the rectifying substance is placed between them in a thin layer.

The valve action of such devices may, in certain circumstances, reach substantial values. The occurrence of this valve action is due, more especially in such devices which contain in the rectifying layer the elements of the sulphur group which have a metal as well as a non-metal character, namely selenium and tellurium, to an asymmetrical arrangement of the three parts constituting the cell, viz. the two electrodes and the rectifying substance.

The asymmetry may, for instance, be produced by mechanically pressing the rectifying substance on to one electrode whilst it is intimately connected with the other electrode by being, for instance, fused thereon or deposited thereon electrolytically or by being produced by chemical action on the surface of the electrode from the material of the electrode. The asymmetry may, for instance, also be produced by pressing the rectifying substance on to the one electrode with greater mechanical pressure than on the other electrode or by making the contact surface between the rectifying substance and the one electrode larger than the contact surface between it and the other electrode, or by making the one electrode of a material different from that of the other electrode, or by the surface of the rectifying substance in contact with the one electrode being differently constituted from the surface of the said substance with the other electrode by being, for instance, roughened on the one surface and smooth on the other surface.

Each one of these different kinds of asymmetry causes a certain valve or rectifying action. However, such action may be substantially increased by combining together different kinds of asymmetry.

It has been found that such rectifiers, the rectifying material of which contains selenium or tellurium and is intimately united with one of the two electrodes, give a particularly good rectification and a very large electrical output per unit surface, if the electrode intimately united with the rectifying material is made of a metal of the iron group, to which group belong chiefly iron, nickel, cobalt, chromium, manganese and molybdenum.

It is not necessary to make the electrodes in their entirety of the said metals. It is sufficient to coat electrodes of another material with a surface layer of the said substances. As nickel may be produced in a thin layer on other metals with great ease, this metal is particularly suited for this form of carrying out the invention.

It has also been found that in such a rectifier, the rectifying layer of which contains selenium or tellurium and one electrode of which is firmly united with the rectifying layer whilst the other electrode is only mechanically pressed against this layer, a substantially greater effect is produced if the electrode under mechanical pressure is made of a metal of the tin group.

As metals of the tin group, tin, lead and bismuth have proved to be very useful. In this case it is to be taken into consideration that the chemical nature of the electrode under pressure is of great importance in rectifiers having a rectifying layer containing selenium or tellurium, whereas in other rectifiers of this kind the chemical constitution is immaterial, since it is only a question of the metal used possessing a certain degree of softness, so that it presses uniformly at all points of the surface of the rectifying layer, even if the latter is not perfectly smooth.

In the device according to the invention, therefore, the electrode mechanically pressed against the rectifying layer is preferably used in the form of a thin metal foil, which is uniformly pressed against the rectifying layer by means of a disc of yielding material, e. g. felt or rubber placed upon the foil, so that even harder metals in the form of thin foil may be pressed into contact uniformly and at all points of the surface, and therefore may be employed if their chemical nature conforms to the requirements.

The invention enables rectifying elements to be prepared which possess in one direction a resistance a thousand times greater than that in the other direction.

It has been found that it is not necessary for the said electrode metals to be very pure, since they may contain up to 10% of metals belonging to another group. Metal alloys may also be used for the electrode under mechanical pressure, e. g. alloys of lead with bismuth or tin, or for the electrode which is intimately united with the rectifying layer containing selenium or selenium compounds, e. g. alloys of chromium with iron or of nickel with cobalt.

Lead is very effective as a material for the electrode under mechanical pressure. In the pure state, however, it can only be rolled out into thin foil with difficulty. The additions usually made to the lead, as for example, antimony, cannot however, be used in the present case, without the efficiency being affected. Accordingly a further modification of the invention consists in this that for the present purpose up to 10% of metal belonging to the tin group is added to the lead.

The elements selenium or tellurium contained in the rectifying layer may be present as free elements or their chemical compounds.

Figure 2:
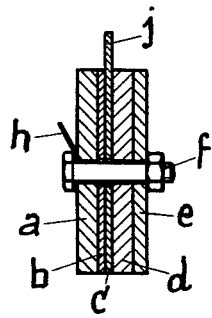
Figure 3:
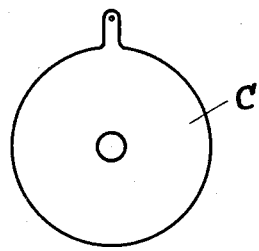

One form of carrying the invention into effect is illustrated, by way of example, in the accompanying drawings. Figure 1 showing a side elevation and Figure 2 being a sectional elevation of the improved rectifier, while Figure 3 illustrates for the sake of clearness a plan view of the metal foil employed.

$a$ is a nickel plate with which a layer $b$ of selenium is intimately connected by the fusing of the selenium on the nickel. A metal foil $c$ provided with a projection $j$ serving as an electric terminal abuts against the layer of selenium. $h$ is the other terminal of the rectifier, which is connected with the nickel plate $a$. $d$ is a rubber plate which is pressed by means of the metal plate $e$ and screw $f$ against the metal foil $c$, so that the latter shall make good contact with the surface of the selenium layer at all points.

What I claim is:—

1. An alternating current rectifier comprising two electrodes and a rectifying layer containing between the said electrodes selenium, the one electrode being intimately united with the rectifying layer whilst the other electrode is mechanically pressed against the said rectifying layer, and the former electrode consisting of a metal of the iron group.

2. An alternating current rectifier comprising two electrodes and a rectifying layer containing between the said electrodes selenium, the one electrode being intimately united with the rectifying layer whilst the other electrode is mechanically pressed against the said rectifying layer, the former electrode consisting of a metal of the iron group and the latter electrode of a metal of the tin group.

In testimony whereof I have signed my name to this specification.

ERNST PRESSER.